(12) United States Patent
Kalisz et al.

(10) Patent No.: US 8,573,643 B1
(45) Date of Patent: Nov. 5, 2013

(54) ACTIVE BOLSTER WITH GAS DIRECTING CHANNELS

(75) Inventors: Raymond E. Kalisz, Livonia, MI (US);
Roger J. Chen, Oxford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 13/466,410

(22) Filed: May 8, 2012

(51) Int. Cl.
*B60R 21/261* (2011.01)
*B60R 21/206* (2011.01)

(52) U.S. Cl.
USPC ........ 280/740; 280/742; 280/730.1; 280/732; 280/752

(58) Field of Classification Search
USPC ........... 280/752, 751, 753, 730.1, 730.2, 732, 280/740, 742
See application file for complete search history.

(56) References Cited

U.S. PATENT DOCUMENTS

| | | | |
|---|---|---|---|
| 5,547,214 A * | 8/1996 | Zimmerman et al. | 280/730.1 |
| 5,752,717 A * | 5/1998 | Galbraith et al. | 280/743.1 |
| 6,619,689 B2 * | 9/2003 | Spencer et al. | 280/730.1 |
| 6,758,493 B2 * | 7/2004 | Conlee et al. | 280/753 |
| 6,871,872 B2 | 3/2005 | Thomas | |
| 7,083,185 B2 | 8/2006 | Fangmann et al. | |
| 7,331,605 B2 * | 2/2008 | Crohn et al. | 280/740 |
| 7,393,013 B2 | 7/2008 | Best et al. | |
| 7,481,453 B2 | 1/2009 | Breed | |
| 7,980,589 B2 * | 7/2011 | Best et al. | 280/730.1 |
| 8,328,230 B1 * | 12/2012 | Kalisz | 280/730.1 |
| 8,388,020 B2 * | 3/2013 | Ciplijauskas et al. | 280/743.1 |
| 2005/0023802 A1 * | 2/2005 | Enders et al. | 280/728.2 |
| 2006/0261581 A1 * | 11/2006 | Kansteiner et al. | 280/732 |
| 2007/0080521 A1 | 4/2007 | Leserre et al. | |
| 2008/0203709 A1 | 8/2008 | Schlemmer | |
| 2009/0152848 A1 * | 6/2009 | Sadr et al. | 280/730.2 |
| 2009/0250915 A1 * | 10/2009 | Best et al. | 280/742 |
| 2010/0117342 A1 | 5/2010 | Kim | |
| 2011/0115201 A1 | 5/2011 | Best et al. | |
| 2011/0198827 A1 | 8/2011 | Roychoudhury | |
| 2011/0272926 A1 | 11/2011 | Roychoudhury et al. | |
| 2011/0316300 A1 | 12/2011 | Kalisz | |

* cited by examiner

*Primary Examiner* — Faye M Fleming
*Assistant Examiner* — George Spisich
(74) *Attorney, Agent, or Firm* — Vichit Chea; MacMillan, Sobanski & Todd, LLC

(57) ABSTRACT

An active bolster has an expandable inner wall including a bay having first and second opposing ends and a central bowl. An expandable outer wall overlies the inner wall to provide a main cavity therebetween. An inflator is mounted within the bay having an outlet nozzle with a plurality of outlet passages for radially discharging an inflation gas against the bay and the outer wall in response to inflate the main cavity during a crash. The inner wall of the central bowl includes a plurality of first dispersion ribs substantially parallel with one another and following arcuate paths to provide at least one gas channel with opposite ends emptying from the central bowl into the main cavity. The outer wall includes a plurality of second dispersion ribs oriented to channel inflation gas from the central bowl toward the outer peripheral edges.

5 Claims, 2 Drawing Sheets

ACTIVE BOLSTER WITH GAS DIRECTING CHANNELS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to guiding the dispersion of inflation gas during inflation of the bolster.

An active bolster is a type of vehicle occupant protection device having a gas-inflatable bladder to absorb impacts and reduce trauma to occupants during a crash. As opposed to deploying air bag cushions through various openings, active bolsters use the interior trim surface itself to expand at the beginning of a crash event for absorbing the impact and dissipating energy through the action of an inflation gas. Co-pending application publication US2011/0316300A1, filed Jun. 26, 2010, entitled "Active Knee Bolster for Automotive Vehicle," which is incorporated herein by reference in its entirety, discloses an active knee bolster integrated into a glove box door that is light weight and visually attractive. Active bolsters are also commonly integrated into door panels for side impact protection.

In a typical structure, an active bolster includes a bladder comprised of an outer or front wall that faces a vehicle occupant attached to an inner or back wall along a sealed periphery. One or both of the walls are deformable in order to provide an inflatable bladder. The walls are initially spaced apart by only a small amount when in their non-inflated condition. This allows ingress of the inflation gas in a manner that achieves an even inflation across the panel.

The inner and outer walls of a typical active bolster are comprised of molded thermoplastics such as polyethylene, polyolefin, or PVC. They can be blow molded or injection molded. The inner wall commonly employs a pleated structure that unfolds in an accordion-like fashion during inflation to provide the increasing volume of the bladder for forming an impact cushion. A central portion of the inner wall is braced against a reaction surface such as a structural frame or strut of the vehicle.

The pressurized gas needed for inflating an active bolster during a crash event is supplied by an inflator. The inflator includes a canister containing a pyrotechnic material and other substances to quickly generate a large amount of expanding gas when triggered. The gas is discharged through a nozzle into the bladder. A bay or recess is typically provided in the inner wall to accommodate the inflator. One reason for placing the nozzle within the bladder has been to directly couple the inflation gas to the bladder, thereby avoiding any need for ducts or other means for conveying the gas.

Since inflation must occur very quickly, the discharged gas is at a high pressure. The resulting structural load applied to the plastic bladder walls just at the areas being directly impacted by the gas is high enough to cause extra stretching of those areas. The localized stresses create corresponding bulges in the walls which result in uneven deployment, loss of energy, and potential rupturing. Loss of energy may require a larger, more expensive inflator to be used. To combat these problems, a deflecting cap could be mounted onto the nozzle to diffuse the discharging gas, but the manufacturing cost and assembly operations required would negatively impact the overall cost of the bolster.

SUMMARY OF THE INVENTION

In one aspect of the invention, an active bolster is provided for protecting a person in a passenger seating area in an automotive vehicle during a crash event. An expandable inner wall bears against a reaction surface of the vehicle, wherein the inner wall includes a bay having first and second opposing ends and a central bowl. An expandable outer wall overlies the inner wall and provides a Class A interior trim surface of the vehicle. The outer wall and the inner wall have outer peripheral edges joined together to provide a main cavity therebetween. The bay in the inner wall extends away from the outer wall. An inflator is mounted at least partially within the bay having an outlet nozzle with a plurality of outlet passages for radially discharging an inflation gas against the bay and the outer wall in response to the crash event to inflate the main cavity. The inner wall of the central bowl includes a plurality of first dispersion ribs protruding from the inner wall toward the nozzle, the first dispersion ribs being substantially parallel with one another and following arcuate paths to provide at least one gas channel with opposite ends emptying from the central bowl into the main cavity. The outer wall includes a plurality of second dispersion ribs protruding from the outer wall toward the central bowl. The second dispersion ribs are oriented to channel inflation gas from the central bowl toward the outer peripheral edges.

DETAILED DESCRIPTION OF PREFERRED EMBODIMENTS

Figure 1:
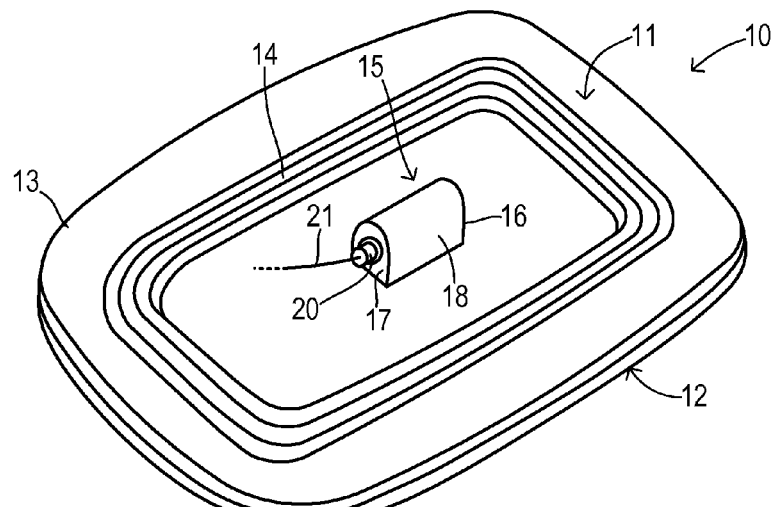
FIG. 1 is a rear perspective view of an active bolster of the prior art.

Referring now to FIG. 1, an active bolster 10 includes an inner wall 11 and an outer wall 12 which are joined around their outer peripheral edges 13. Walls 11 and 12 are made of a suitable thermoplastic (such as polyethylene, polyolefin, or PVC) and are preferably formed using injection molding or other molding methods capable of forming a ribbed surface to act as gas dispersion channels as will be described below. When using separately molded inner and outer walls 11 and 12, the outer peripheral edges 13 are sealed by a weld (e.g., vibration welding or hot-plate welding).

Inner wall 11 includes a series of pleats 14 adapted to extend during inflation so that outer wall 12 expands outwardly toward a vehicle occupant. Inner wall 11 also includes a bay 15 to create a recess that extends away from outer wall 12 for receiving an inflator 20. Bay 15 has opposing ends 16 and 17 to which inflator 20 is attached. A central bowl 18 between ends 16 and 17 accommodates the main body of inflator 20. An electrical signal line 21 is coupled to inflator 20 and to a controller/driver (not shown) in a conventional manner.

Figure 2:
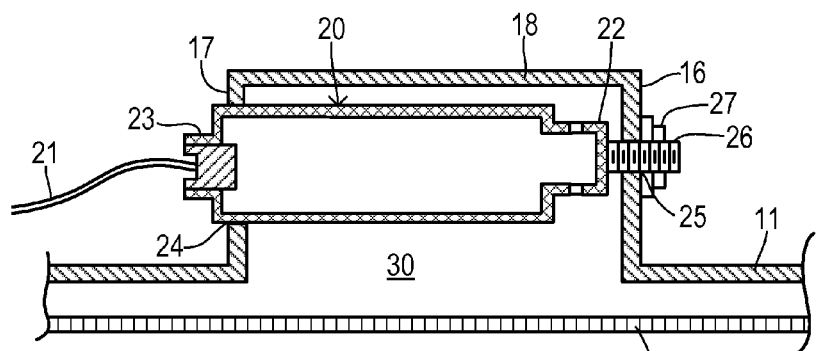
FIG. 2 is a cross section of a prior art bolster showing an inflator prior to being activated.

As shown in cross section in FIG. 2, inflator 20 includes an elongated cylinder with a nozzle 22 at one end and a connecting body 23 at the other end. Bay ends 16 and 17 have mounting apertures 25 and 24, respectively. During assembly, inflator 20 may be inserted through aperture 24 until a threaded extension 26 passes through aperture 25. A nut 27 secures extension 26 and apertures 24 and 25 are sealed to prevent loss of gas during inflation.

Figure 3:
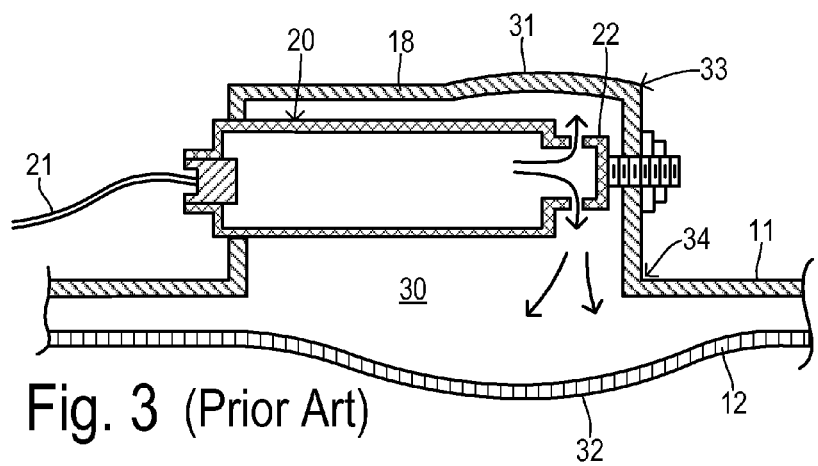
FIG. 3 is a cross section of the prior art bolster of FIG. 2 are inflation begins.

Walls 11 and 12 are spaced apart to provide a main cavity 30. Upon activation of inflator 20, an inflation gas is generated that is discharged into main cavity 30 through nozzle 22 as shown in FIG. 3. Although an even deployment in which walls 11 and 12 separate according to a pre-defined shape is desired, uneven stresses applied against different portions of walls 11 and 12 have potentially resulted in undesired bulges 31 and 32. Such bulging corresponds to extra stretching of the plastic walls and loss of energy that would be better used to obtain the overall expansion of the bladder. In addition, sharp corners 33 and 34 have also been present in prior art designs which concentrate stresses and further exacerbate the loss of energy and the potential for ruptures.

Figure 4:
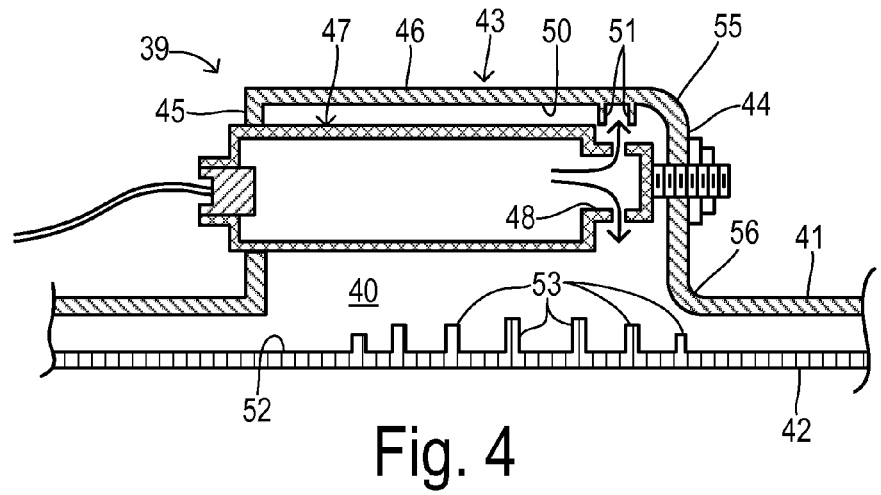
FIG. 4 is a cross section of an active bolster of the invention in the initial stage of inflation.
Figure 5:
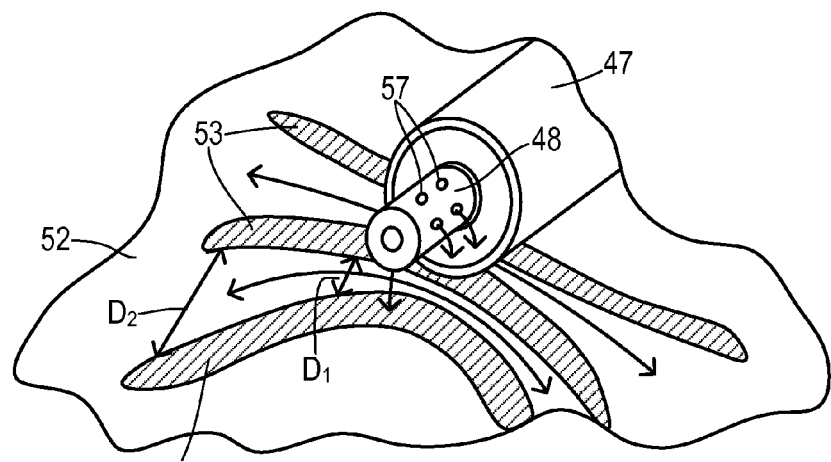
FIG. 5 is a partial, internal perspective view showing diffusion ribs on the outer wall.
Figure 6:
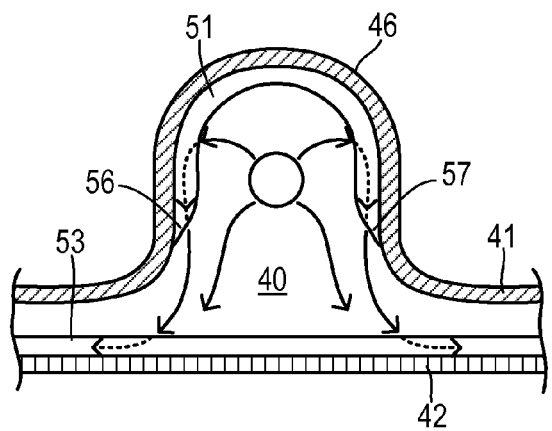
FIG. 6 is a cross section showing a diffused flow of inflation gas resulting from the dispersion ribs of the invention.

An improved bolster 39 of the present invention is shown in FIGS. 4-6. A main cavity 40 is provided between an inner wall 41 and an outer wall 42 which are joined together around their outer peripheral edges. Outer wall 42 provides a surface in an automotive interior trim (and may or may not be covered by an outer skin). Inner wall 41 is mounted to and/or bears against a reaction surface such as a glove box door, an instrument panel frame, or a vehicle door frame. A bay 43 is formed as a recess in inner wall 41 extending away from outer wall 42. Bay 43 has opposite ends 44 and 45 and a central bowl 46. An inflator 47 is mounted in bay 43 as previously described. A nozzle 48 of inflator 47 has a plurality of outlet passages 57 that radially discharge the inflation gas against bay 43 and outer wall 42 in response to activation during a crash event.

Bay 43 has an internal surface 50 from which a plurality of first dispersion ribs 51 protrude. Dispersion ribs 51 are substantially parallel with one another. Since central bowl 46 has a curved profile, dispersion ribs 51 follow arcuate paths and provide at least one gas channel therebetween having opposite ends 56 and 57 emptying from central bowl 46 into main cavity 40. Similarly, outer wall 42 has an internal surface 52 from which a plurality of second dispersion ribs 53 protrude toward central bowl 46. Dispersion ribs 53 are oriented to channel inflation gas received from central bowl 46 toward the outer peripheral edges so that bulges do not form and the energy of the inflation gas is evenly applied within main cavity 40.

As shown in FIG. 5, dispersion ribs 53 preferably include pairs of adjacent ribs for which the lateral spacing increases as the inflation gas is guided toward the peripheral edges. Thus, a lateral spacing $D_1$ proximate to the position where inflation gas enters the gas channel between adjacent ribs is less than a lateral spacing $D_2$ where the inflation gas exits the gas channel. By providing a lateral spacing that is greatest at the opposite ends of the gas channel between adjacent ribs 53, a flow cross section of the gas channel is greatest at the exits so that no pressure buildup occurs at the exits.

As shown in FIG. 6, the two sets of dispersion ribs 51 and 53 can cooperatively diffuse the inflation gas to fill in the internal chamber of the bladder more efficiently. Molded ribs 51 and 53 add little or no cost to the respective components and remove any need for a cap or other modifications to the inflator nozzle.

What is claimed is:

1. An active bolster for protecting a person in a passenger seating area in an automotive vehicle during a crash event, comprising:
    an expandable inner wall for bearing against a reaction surface of the vehicle, wherein the inner wall includes a bay having first and second opposing ends and a central bowl;
    an expandable outer wall overlying the inner wall and providing an interior trim surface of the vehicle, wherein the outer wall and the inner wall have outer peripheral edges joined together to provide a main cavity therebetween, and wherein the bay in the inner wall extends away from the outer wall; and
    an inflator mounted at least partially within the bay and having an outlet nozzle with a plurality of outlet passages for radially discharging an inflation gas against the bay and the outer wall in response to the crash event to inflate the main cavity;
    wherein the inner wall of the central bowl includes a plurality of first dispersion ribs protruding from the inner wall toward the nozzle, the first dispersion ribs being substantially parallel with one another and following arcuate paths to provide at least one gas channel with opposite ends emptying from the central bowl into the main cavity; and
    wherein the outer wall includes a plurality of second dispersion ribs protruding from the outer wall toward the central bowl, the second dispersion ribs being oriented to channel inflation gas from the central bowl toward the outer peripheral edges.

2. The active bolster of claim 1 wherein the second dispersion ribs include at least one pair of adjacent ribs having a lateral spacing that is greatest at their opposite ends to provide a corresponding gas channel having a flow cross section that is greatest where the inflation gas exits the corresponding gas channel during the inflation of the main cavity.

3. The active bolster of claim 1 wherein the inner wall and the outer wall is each comprised of injection molded thermoplastic.

4. The active bolster of claim 3 wherein the thermoplastic is comprised of polyolefin.

5. The active bolster of claim 3 wherein the inner and outer walls are joined along the outer peripheral edges by a weld.

\* \* \* \* \*